US009921048B2

(12) United States Patent
Murata et al.

(10) Patent No.: US 9,921,048 B2
(45) Date of Patent: Mar. 20, 2018

(54) METHOD, SYSTEM AND TARGET FOR SETTING REFERENCE POINTS ON CONSTRUCTION

(71) Applicant: Big Survey & Design Co. Ltd., Tokyo (JP)

(72) Inventors: Toyotoshi Murata, Tokyo (JP); Kazuhito Yamamoto, Tokyo (JP)

(73) Assignee: Big Survey & Design Co. Ltd., Tokyo (JP)

( * ) Notice: Subject to any disclaimer, the term of this patent is extended or adjusted under 35 U.S.C. 154(b) by 122 days.

(21) Appl. No.: 15/024,660

(22) PCT Filed: Sep. 25, 2013

(86) PCT No.: PCT/JP2013/075829
§ 371 (c)(1),
(2) Date: Jul. 5, 2016

(87) PCT Pub. No.: WO2015/045020
PCT Pub. Date: Apr. 2, 2015

(65) Prior Publication Data
US 2016/0334202 A1 Nov. 17, 2016

(51) Int. Cl.
*G01B 11/00* (2006.01)
*G01C 15/00* (2006.01)
*G01C 15/06* (2006.01)

(52) U.S. Cl.
CPC ............ *G01B 11/002* (2013.01); *G01C 15/00* (2013.01); *G01C 15/06* (2013.01)

(58) Field of Classification Search
CPC ....... G01C 15/00; G01C 15/06; G01B 11/002
(Continued)

(56) References Cited

FOREIGN PATENT DOCUMENTS

JP 07-134029 5/1995
JP 10-253783 9/1998
(Continued)

OTHER PUBLICATIONS

The International Bureau of WIPO, International Preliminary Report on Patentability for International Application No. PCT/JP2013/075629, dated Apr. 7, 2016, eleven (11) pages.

*Primary Examiner* — Tri T Ton
(74) *Attorney, Agent, or Firm* — Iandiorio Teska & Coleman, LLP

(57) ABSTRACT

A position adjusting mechanism 30 with a target 10 mounted thereon is fixed at a plurality of reference points S1 to S16 respectively on a construction 1, and initial 3D coordinates C0 of the targets 10 are surveyed and stored. When deformation or distortion of the construction 1 occurs, a deviation ΔC (=Ct−C0) of 3D coordinate Ct of each of the targets 10 from the initial 3D coordinate C0 thereof are detected by a deviation detecting means 26, and each of the targets 10 recovers the initial 3D coordinate C0 by the position adjusting mechanism 30 thereof in accordance with the detected deviation ΔC. Preferably, 3D coordinates of the targets 10 are surveyed by a 3D measuring instrument which collimates the targets 10 to output 3D vectors for the targets 10. The position adjusting mechanism 30 may includes guide stage for guiding the target 10 mounted thereon in a direction or in two directions that intersect at right angle, the direction or directions parallel to a surface F of the construction 1, and feed mechanism for sliding the target 10 on the guide stage in predetermined amount.

20 Claims, 6 Drawing Sheets

(58) Field of Classification Search
USPC .................................................. 356/614–640
See application file for complete search history.

(56) References Cited

FOREIGN PATENT DOCUMENTS

| | | |
|---|---|---|
| JP | 2003-506691 | 2/2003 |
| JP | 2009-97985 | 5/2009 |
| JP | 2011-208992 | 10/2011 |
| JP | 2012-173130 | 9/2012 |
| JP | 2012-189612 | 10/2012 |

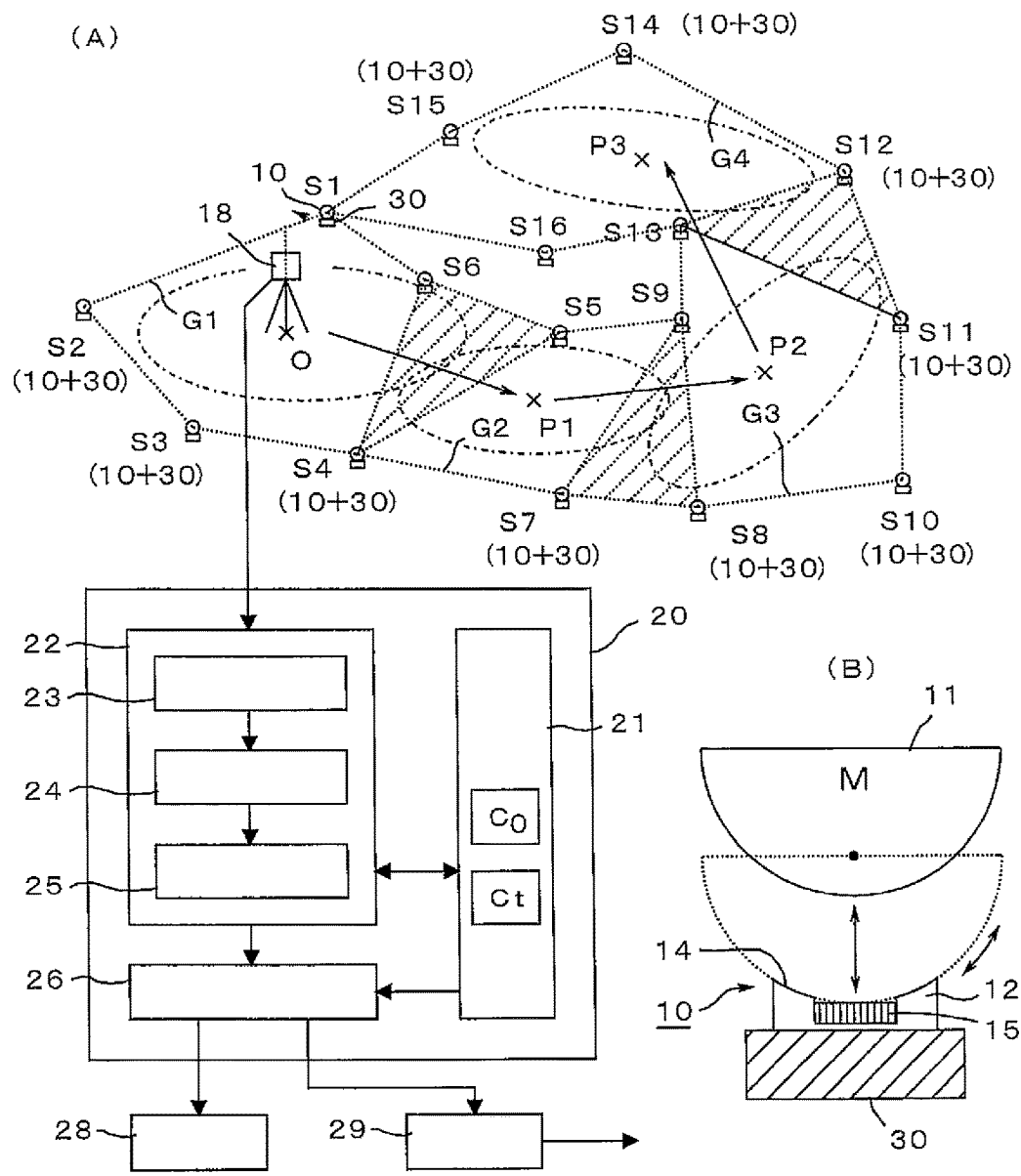
[FIG.1]

[FIG.2]
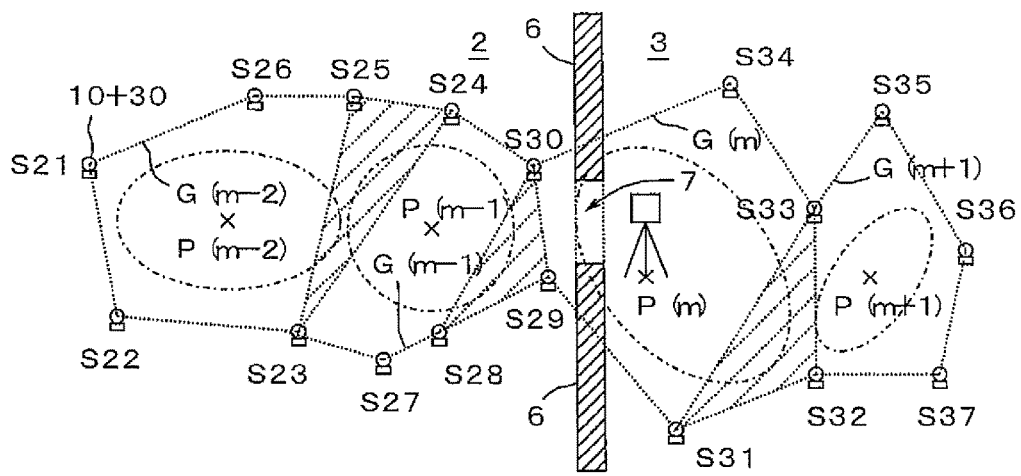
[FIG.3]
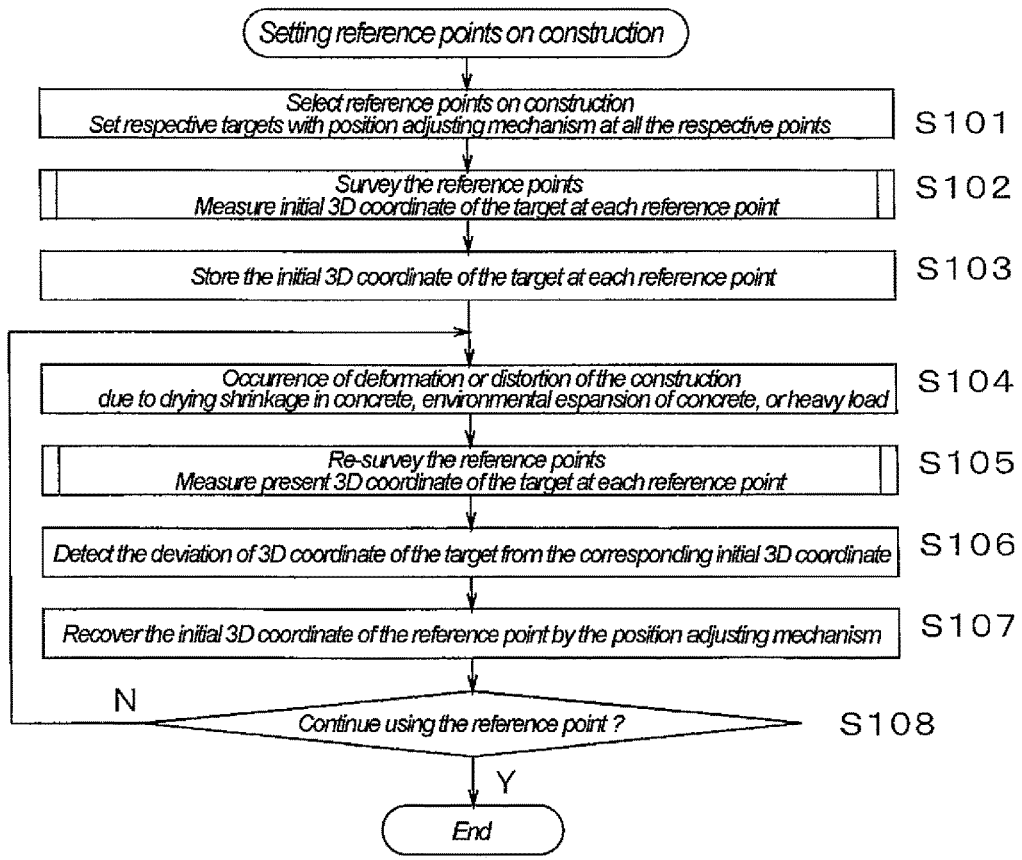

[FIG.4]
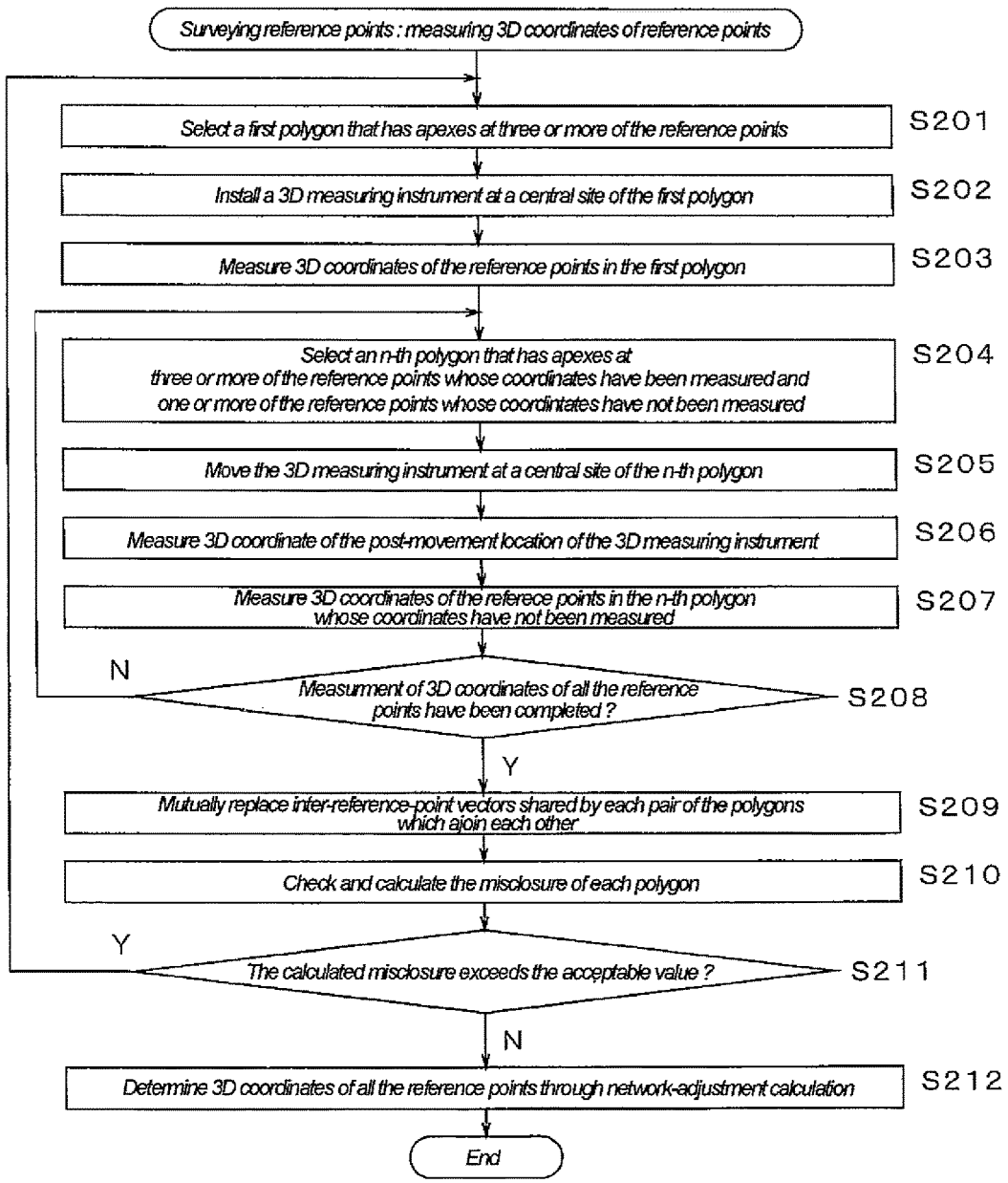

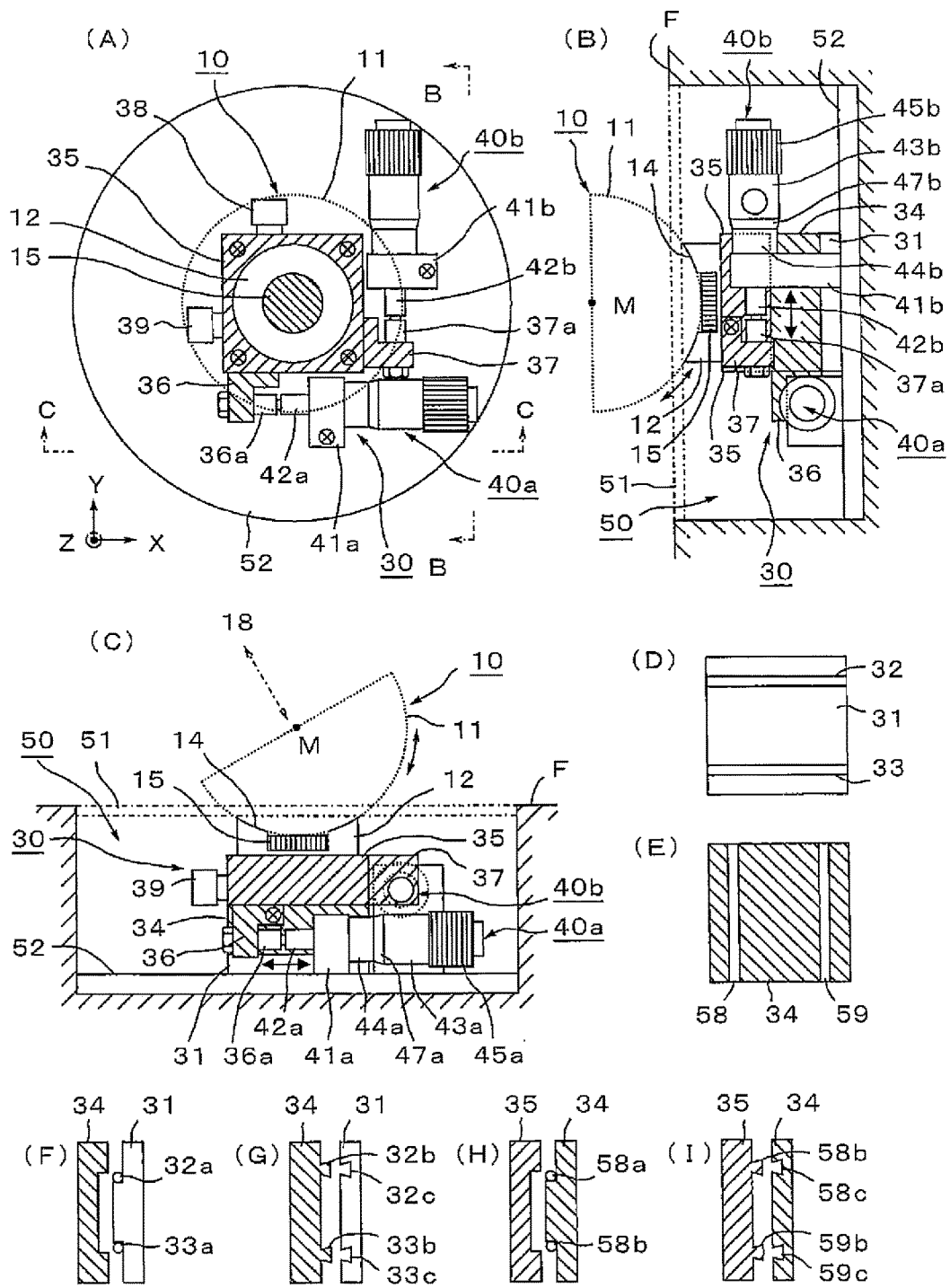
[FIG.5]

[FIG. 6]
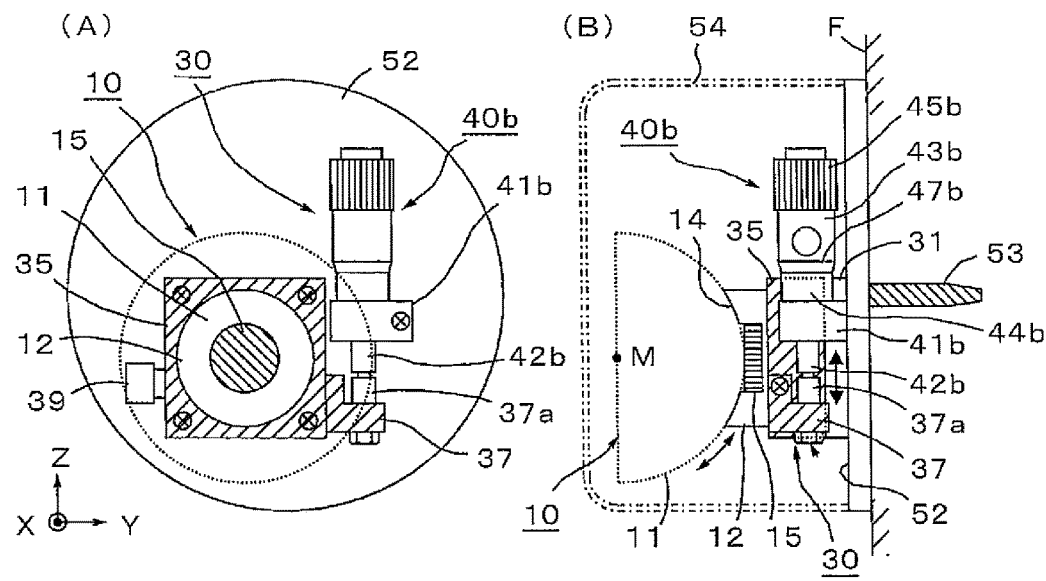
[FIG. 7]
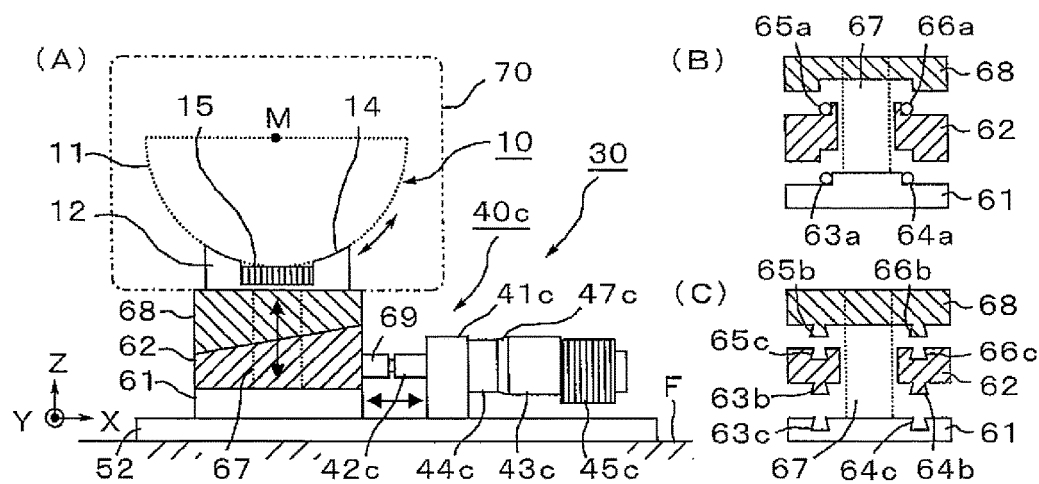

[FIG.8]
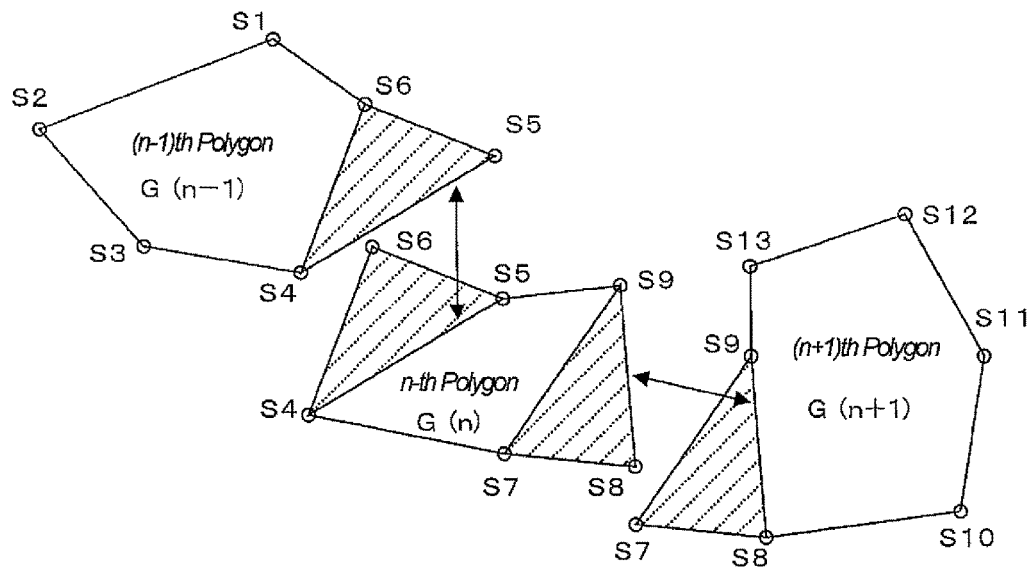
[FIG.9]
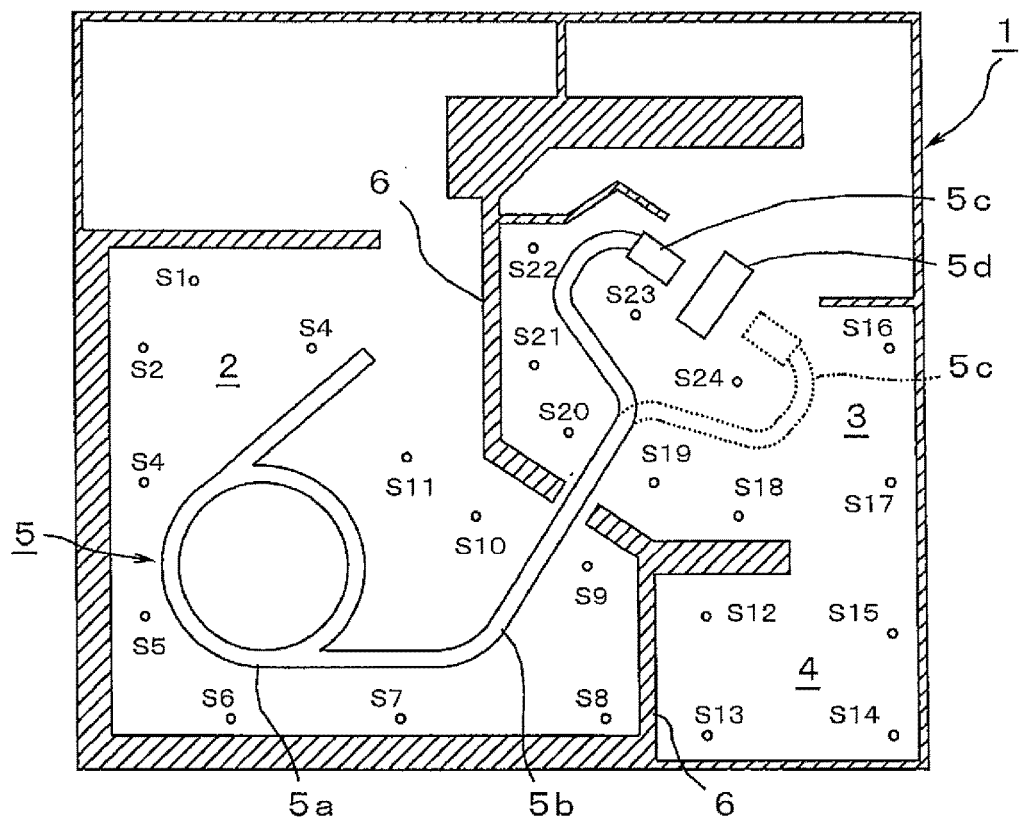

METHOD, SYSTEM AND TARGET FOR SETTING REFERENCE POINTS ON CONSTRUCTION

TECHNICAL FIELD

The present invention relates to a method, system and target for setting reference points on construction, and more specifically, to a method, system and target for setting a plurality of reference points on civil engineering or architectural construction (it is referred to as simply "construction" hereinafter) which may be liable for deformation or distortion.

BACKGROUND ART

When a plurality of devices, apparatuses and the like are installed on construction while their positions are being adjusted accurately, there are cases where reference points for alignment are set on the construction in advance, in order to perform the work and control efficiently. In case of maglev system (i.e. a linear motor vehicle system), for example, a guideway for the traveling track is constructed made of structural members such as concrete and steel materials, and a plurality of ground coils (superconducting coils) that cause vehicles to float and propel over the guideway are installed along a longitudinal direction of the guideway. In general, the guideway structured with concrete allows for a construction tolerance of about 2 cm to 3 cm, whereas the ground coils are required to be structured with high accuracy, the tolerance being at most 2 mm or 3 mm, in order to assure a comfortable ride and security for floating type vehicles traveling at high speeds. For that purpose, a method of structuring ground coils with desired accuracy is employed, in which a plurality of reference points whose 3D coordinates are determined are set at the center of a guideway, or a construction, along a longitudinal direction of the guideway with high accuracy in advance, and then ground coils are structured while their relative locations to these reference points or differences in altitude therebetween are measured and controlled (refer to Non-Patent Document No. 1).

Referring to FIG. 9, for example, it is assumed that a plurality of large-sized apparatuses 5 such as a high energy accelerator device, a proton beam therapy (cancer-therapy) device, or a particle beam therapy (cancer-therapy) device, are installed in a building construction 1 such as a research facility or medical facility. In FIG. 9, the large-sized apparatuses 5 include an accelerator 5a, a conveying pipe line 5b, a radiation apparatus 5c, a treatment table 5d, etc. In order to obtain a high quality energy-beam, proton-beam or particle-beam, each apparatus is required to be installed with extremely high accuracy, the tolerance being about 0.01 mm to 0.1 mm (10 μm to 100 μm) (refer to Non-Patent Document Nos. 2 and 3). For that purpose, such method of installing the apparatuses 5a, 5b, 5c and 5d is employed that a plurality of reference points S1 to S24 with determined 3D coordinates are set in advance on the floor of the construction 1 on which the apparatuses are to be installed with high accuracy, and then the positions of the apparatuses 5a, 5b, 5c and 5d are adjusted while their relative locations to each of the reference points S1 to S24 and differences in altitude therebetween are controlled. The reference points may be set on the wall and/or the ceiling of the construction 1, when necessary.

The method of installing the apparatuses 5a, 5b, 5c and 5d by using the reference points S1 to S24 as shown in FIG. 9 will be described below to the extent of the need to understand the present invention.

(1) First, the plurality of reference points S1 to S24 are selected within a fixed area on the construction 1, and targets for surveying are set at these reference points.

(2) Then, 3D coordinates of each reference point S are measured with a surveying instrument. The typical surveying instrument may be a total station or TST (total station theodolite) configured by integrating a phase difference detecting type lightwave distance meter with a theodolite (angle measuring instrument). More specifically, the center of the surveying instrument is aligned with the reference point S1. Then, the surveying instrument at the reference point S1 collimates the target at the reference point S2, and determines the lateral and vertical angles and length of the survey line. In this manner, 3D coordinates of the reference point S2 are measured in a coordinate system that has an origin at the reference point S1. Following this, the surveying instrument is moved to the reference point S2, and the center of the surveying instrument is aligned with the reference point S2. Then, the surveying instrument at the reference point S2 collimates the target at the reference point S3, and determines the lateral and vertical angles and length of the survey line. In this manner, 3D coordinates of the reference point S3 are measured in the same coordinate system. By sequentially repeating a cycle of collimating the target at a reference point S (n+1) to measure its 3D coordinates by using the surveying instrument aligned with a reference point Sn likewise, 3D coordinates of all the reference points S are measured in the same coordinate system. Finally, errors contained in the measured coordinates of each reference point are minimized with the network-adjustment calculation. As a result, 3D coordinates of the reference points S1 to S24 are determined (generally known as "open-traverse surveying method").

(3) After 3D coordinates of each reference point S are surveyed, the apparatuses 5a, 5b, 5c and 5d are installed at required locations within the construction 1 while their relative locations to each reference point S and differences in altitude therebetween are being measured with a 3D measuring instrument. More specifically, additional targets are mounted on the apparatuses 5a, 5b, 5c and 5d, and then the 3D measuring instrument collimates each target to determine 3D vector from the center of the measuring instrument (center of the machine) to each target. For example, the 3D measuring instrument at the same location determines the respective 3D vectors for the targets at the reference points S and the targets on the apparatuses 5a, 5b, 5c and 5d. Then, the apparatuses 5a, 5b, 5c and 5d are installed while their relative locations to each reference point S and differences in altitude therebetween are calculated accurately from 3D vectors. A typical example of such a 3D measuring instrument may be a laser tracker configured by integrating an optical interferometric type laser distance meter with a theodolite, or a 3D total station configured by integrating a phase difference detecting type lightwave distance meter with a theodolite. Using a laser tracker or a 3D total station enables the relative locations of the apparatuses 5a, 5b, 5c and 5d to each reference point S and differences in altitude therebetween to be measured with high accuracy, the tolerance being at most 10 μm to 100 μm (refer to Patent Document Nos. 1, 2 and Non-Patent Document No. 3).

PRIOR ART DOCUMENTS

Patent Documents

[Patent Document No. 1]
Japanese Patent Laying-open Publication No. 2003-506691
[Patent Document No. 2]
Japanese Patent Laying-open Publication No. 2011-208992

Non-patent Documents

[Non-Patent Document No. 1]
Shoichi Hashimoto "Research vision—Research and technical development of maglev guideway" Collected papers in Japan Society of Civil Engineers, No. 619/I-47, April, 1999, pp. 1-12, the Internet <http://library.jsce.or.jp/jsce/open/00037/1999/619-0001.pdf>
[Non-Patent Document No. 2]
Kou Izeki and others "Toward realizing high-efficiency and high-accuracy irradiation system for heavy-ion radiotherapy and reducing burden on patients" Toshiba Review, Vol. 68, No. 1, 2013, the internet <http://www.toshiba.co.jpitech/review/2013/01/68 01pdf/a05.pdf>
[Non-Patent Document No. 3]
Hiroaki Kimura and Sakuo Matsui "Measurement technology for displacement of building that support XFEL performance" Precision Engineering Journal, Vol. 75, No. 12, 2009, the Internet <https://www.jstage.jst.go.jp/article/jjspe/75/12/75 12 1400/pdf>
[Non-Patent Document No. 4]
Takehisa Harada "Survey measuring method—from method of matrix least squares to network-adjustment calculation" Kajima Institute Publishing Co., Ltd., June 2001

SUMMARY OF INVENTION

Technical Problem to be Solved

Conventional reference points set on the construction as described above are required to be stable at the fixed position initially determined, however, are difficult to be stable on the construction. In general, the construction may liable to deforme or distort for various reasons. The construction made of concrete, for example, is generally known to be deformed or distorted by drying shrinkage in concrete, or environmental shrinkage/expansion of concrete etc. The deformation or distortion of the construction due to such drying shrinkage in concrete etc. is not so large as to endanger the safety of the construction, but has some effect on the stability of the reference points on the construction that are required to be set with extremely high accuracy as described above. In case time passed between the setting of the targets at reference points and the installation of the apparatuses 5a, 5b, 5c and 5d on the construction, the construction may be deformed or distorted during such times due to the drying shrinkage in concrete etc., which results in increased measurement error for 3D coordinates of each reference points. If the measurement error for each reference point increases, an installation error for the apparatuses 5 cannot be held to at most 10 µm to 100 µm even by installing the apparatuses 5 while their relative locations to each reference point and differences in altitude therebetween are being measured accurately as described above.

Further, when the large-sized apparatuses 5a, 5b, 5c and 5d such as a high energy accelerator device, a proton beam therapy device, or a particle beam therapy device are installed in the construction as described above, stresses due to heavy loads of such apparatuses 5 may cause deformation or distortion of the construction 1. Such deformation or distortion of the construction has negative effect on the stability of the reference points that have been set on the construction before the installation of the apparatuses 5, which results in increased measurement error for 3D coordinates of each reference points after the installation of the apparatuses 5. If the measurement error for each reference point increases after installation, the positions of the apparatuses 5 cannot be adjusted or aligned by using the reference points after installation of the apparatuses 5, even if 3D coordinate of the reference points on the construction are set with high accuracy before installation of the apparatuses 5. There is a need for a technique in which the apparatuses 5a, 5b, 5c and 5d are adjusted or aligned accurately after installation on the construction, by using the reference points that have been set on the construction before the installation of the apparatuses, even if the construction is deformed or distorted during the installation of the apparatuses.

Accordingly, an object of the present invention is to provide a method and system for setting reference points on construction which are usable for accurate adjustment or alignment on the construction even when deformation or distortion of the construction occurs.

Solution to Problem

Referring to FIG. 1 and a flowchart in FIG. 3, the first aspect of the present invention provides a method for setting reference points on construction comprising the steps of:

fixing a position adjusting mechanism 30 with a target 10 (see FIGS. 5, 6 and 7) mounted thereon at a plurality of reference points S1 to S16 respectively on a construction 1 (see FIG. 9);

surveying and storing initial 3D coordinates C0 of the targets 10;

detecting a deviation $\Delta C$ ($=Ct-C0$) of 3D coordinate Ct of each of the targets 10 from the initial 3D coordinate C0 thereof when deformation or distortion of the construction 1 occurs; and recovering the initial 3D coordinate C0 of each of the targets 10 by the position adjusting mechanism 30 thereof in accordance with the detected deviation $\Delta C$.

Referring to FIG. 1, the second aspect of the present invention provides a system for setting reference points on construction comprising:

respective position adjusting mechanisms 30 with respective targets 10 mounted thereon to be fixed at a plurality of reference points S1 to S16 on a construction 1 (see FIG. 9);

a 3D measuring instrument 18 for collimating the targets 10 to output 3D vectors for the targets 10;

a surveying means 22 for receiving 3D vectors output from the 3D measuring instrument 18 for surveying 3D coordinates of the targets 10;

a storage means 21 for storing initial 3D coordinates C0 of the targets 10; and a deviation detecting means 26 for detecting a deviation $\Delta C$ ($=Ct-C0$) of 3D coordinate Ct of each of the targets 10 from the initial 3D coordinate C0 thereof when deformation or distortion of the construction 1 occurs, whereby each of the targets 10 recovers the initial 3D coordinate C0 by the position adjusting mechanism 30 thereof in accordance with the detected deviation $\Delta C$.

In a preferred embodiment, the 3D measuring instrument 18 is a laser tracker or a 3D total station. Desirably, as shown in FIG. 1(B), each of the targets 10 includes a target body 11 having a spherical or hemispherical outer shell, and a mounting stage 12 with a hemispherical groove into which the outer shell of the target body removably fits.

More preferably, as shown in FIGS. 5 and 6, each of the position adjusting mechanism 30 includes guide stage 31 and 34 for guiding the target 10 mounted thereon in a direction or in two directions that intersect at right angle, the direction or directions parallel to a surface F of the construction 1; and feed mechanism 40a and 40b for sliding the target 10 on the guide stage 31 and 39 in predetermined amount. Alternatively, as shown in FIG. 7, each of the position adjusting mechanism 30 includes guide stage 61 and 62 for guiding the target 10 mounted thereon in a direction vertical to a surface F of the construction 1; and feed mechanism 40c for moving the target 10 on the guide stage 61 and 62 upward or downward in predetermined amount. As shown in FIGS. 5, 6 and 7, the feed mechanism 40a, 40b and 40c may be a micrometer head.

Effects of Invention

The present invention provides a method and system for setting reference points on construction in which, a position adjusting mechanism 30 with a target 10 mounted thereon is fixed at a plurality of reference points S1 to S16 respectively on a construction 1, and initial 3D coordinates C0 of the targets 10 are surveyed by a surveying means 22 and stored in a storage means 21. When deformation or distortion of the construction 1 occurs, a deviation ΔC (=Ct−C0) of 3D coordinate Ct of each of the targets 10 from the initial 3D coordinate C0 thereof are detected by a deviation detecting means 26, and each of the targets 10 recovers the initial 3D coordinate C0 by the position adjusting mechanism 30 thereof in accordance with the detected deviation ΔC. And hence, the following effects can be achieved as a result.

(A) Each reference point S on the construction 1 is configured by a position adjusting mechanism 30 with a target 10 mounted thereon, which enables each target 10 to recover its initial 3D coordinate C0 by the position adjusting mechanism 30, and results in enhanced stability or resistance of each reference point S against deformation or distortion of the construction 1.

(B) Even when the construction 1 is deformed or distorted after reference points S have been set on it, e.g. by drying shrinkage in concrete, environmental shrinkage/expansion of concrete, etc., and the initial locations C0 of the reference points S are displaced, it is possible to install devices or apparatuses on construction 1 while their positions are being adjusted or aligned accurately using the reference points S on the construction 1, while recovering each reference point S to its initial 3D coordinate C0.

(C) In case a plurality of large-sized devices or apparatuses 5 are installed on the construction 1, such as a high energy accelerator device, a proton beam therapy device, or a particle beam therapy device, etc., which may cause deformation or distortion of the construction 1 due to heavy loads of such apparatuses 5, their positions on the construction 1 can be adjusted or aligned accurately using the reference points S on the construction 1 while recovering each reference point S to its initial 3D coordinate C0, which can enhance the reliability of a work for installing devices or apparatuses with high accuracy on the construction 1.

(D) Further, even if the construction 1 is deformed or distorted after devices or apparatuses have been installed on it, e.g. by drying shrinkage in concrete, environmental shrinkage/expansion of concrete, application of heavy load etc., and the devices or apparatuses are relocated, the gap between the initial location and the relocated one of the devices or apparatuses can be accurately checked using the reference points S on the construction 1 while recovering each reference point S to its initial 3D coordinate C0, which can make it easy and efficient to re-adjust or re-align the device or apparatuses on the construction 1.

(E) By using 3D measuring instrument 18 collimating the targets 10 to output 3D vectors for the targets 10, instead of surveying instrument that measures lateral and vertical angles and distances, each reference point S can be surveyed without need of alignment of the center of the instrument (center of the machine) with each reference point, so that 3D coordinate of each reference point S can be determined with high accuracy through avoidance of adding-up of errors which would be involved in every alignment.

(F) The position adjusting mechanism 30 may include guide stage 31, 34 or guide stage 61, 62 for guiding the target 10 in a direction parallel or vertical to a surface F of the construction 1, and the target 10 may slide on the guide stage 31, 34 or guide stage 61, 62 in predetermined amount, which makes it possible to adjust each target 10 accurately and efficiently in accordance with the detected deviation ΔC.

BRIEF DESCRIPTION OF THE DRAWINGS

The present invention may be performed in various ways and a specific embodiment will now be described by way of example, with reference to the accompanying drawings, in which:

FIG. 1 is a schematic view showing a system for setting reference points on structure according to the present invention;

FIG. 2 is a schematic view of the method for setting reference points on structure according to the present invention, in which a partition is present;

FIG. 3 is a flowchart of a method of setting reference points on structure according to the present invention;

FIG. 4 is a flowchart showing a method for surveying reference points on structure (corresponding to steps S102 and S105 in FIG. 2) according to the present invention;

FIG. 5 is an embodiment of the target and the position adjusting mechanism for the present invention;

FIG. 6 is another embodiment of the target and the position adjusting mechanism for the present invention;

FIG. 7 is a third embodiment of the target and the position adjusting mechanism for the present invention;

FIG. 8 is a schematic view of a check calculating step (from step S209 to step S211 in FIG. 4) according to the present invention;

FIG. 9 is a schematic view of conventional method for installing while adjusting a plurality of large-sized apparatuses on construction.

DESCRIPTION OF EMBODIMENTS

FIG. 1 depicts an embodiment of a system of the present invention for setting a plurality of reference points S on a construction 1, such as a building or a frame structure, in which a plurality of large-sized apparatuses 5 are to be installed as in FIG. 9. The illustrated system includes respective position adjusting mechanisms 30 with respective targets 10 mounted thereon to be fixed at a plurality of reference points S1 to S16 within an area on the construction 1, a 3D measuring instrument 18 collimating each target 10 to output 3D vector from the center of the instrument to each target 10, and a computer 20 receiving 3D vector output from the 3D measuring instrument 18 for surveying 3D coordinates of each target 10.

The 3D measuring instrument 18 may be, for example, a laser tracker configured by integrating a laser distance meter with a theodolite, or a 3D total station configured by integrating a lightwave distance meter with a theodolite. Conventional surveying instrument, such as a total station or TST (total station theodolite), may be applied for surveying 3D coordinates of each target 10. However, conventional surveying instrument employs a open-traverse surveying method, in which 3D coordinates of reference points S are measured by repeatedly measuring lengths and angles of survey lines while sequentially linking reference points S to one another through the survey lines. Accordingly, every time a further reference point S is linked, errors are disadvantageously added up. More specifically, since the instrument center of the surveying instrument is required to be aligned with each reference point S in the open-traverse surveying method, errors generated due to this alignment are added up, which results in increased measurement error for 3D coordinates of each reference points.

In contrast, the measuring instrument 18 collimates a target 10 from any given location, and output 3D vector from the instrument center (center of the machine) to the target with high accuracy, which results in eliminating the need to align the instrument center with each reference point S, thereby being able to avoid the adding-up of errors which would be involved in every alignment. It is thus possible to survey 3D coordinates of each reference point S with high accuracy, for example, the tolerance being about 6 μm to 10 μm when the measurement distance is 10 m, by using the laser tracker or the 3D total station.

Respective targets 10 to be installed at each reference point S may be, for example, a reflective mirror, reflective prism or reflective sheet, being selectable depend on the 3D measuring instrument 18. In case that a laser tracker is used as the measuring instrument 18, each target 10 may be a corner cube reflective mirror or a reflective prism. In case that a 3D total station is used as the measuring instrument 18, each target 10 may be reflective mirror, reflective prism and reflective sheet. Preferably, as shown FIG. 1(B), each target 10 includes a target body 11 having a spherical or hemispherical outer shell, and a mounting stage 12 equipped with a hemispherical groove 14 into which the outer shell of the target body 11 removably fits. The mounting stage 12 is fixed at each reference point S, and the target body 11 is mounted on the mounting stage 12 by fitting the hemispherical outer shell of the target body 11 into the hemispherical groove 14 of the mounting stage 12.

By fitting the spherical or hemispherical target body 11 into the hemispherical groove 14 in the mounting stage 12, as shown in FIG. 1(B), the reflective orientation of the reflective surface (cross section of the sphere) of the target body 11 can be changed easily without moving a center point M (center of the sphere) of the target body 11. Further, the target body 11 can be removed easily from the mounting stage 12, and can be easily remounted on the mounting stage 12 while aligning the center point M of the target body 11 with a corresponding reference point S. The outer shell of the target body 11 may be made of metal, and may include a magnet 15 embedded in the groove bottom portion of the mounting stage 12 which prevents the target body 11 from falling from the mounting stage 12 when the mounting stage 12 is inclined or upright. However, it should be noted that the magnet 15 is not an essential component.

The target 10 in FIG. 1(B) is mounted on a position adjusting mechanism 30 for adjusting the locations of the mounting stage 12 and the center point M of the target body 11. The position adjusting mechanism 30 makes it possible for the target 10 thereon at the reference point S to recover a initial location (initial coordinates) of the reference point S when the initial location is displaced, due to deformation or distortion of the construction 1 caused by earthquakes, drying shrinkage in concrete, environmental shrinkage/expansion of concrete, or application of heavy load etc, as described above.

The computer 20 in FIG. 1(A) includes an output device 28 such as a display, an input device such as keyboard or mouse, and a storage means 21 such as primary memory or secondary memory. In addition, the computer 20 includes a surveying means 22, as a built-in program, for receiving 3D vectors output from the 3D measuring instrument 18 for surveying 3D coordinates of each target 10, and a deviation detecting means 26 for detecting a deviation $\Delta C$ ($=Ct-C0$) of 3D coordinates $Ct$ of each reference points S1 to S16 at a time t from a initial 3D coordinates $C0$ thereof when deformation or distortion of the construction 1 occurs. The initial 3D coordinates $C0$ of each reference points S1 to S16 may be surveyed by the measuring instrument 18 and stored in the storage means 21 in the computer 20, for example, immediately after completion of the construction 1 or after set-up of the targets 10 fixed at the reference points S1 to S16. In FIG. 1(A), the computer 20 includes a position adjusting means 29 for controlling the position adjusting mechanism 30 at each of the reference points S1 to S16 in accordance with the detected deviation $\Delta C$ from the deviation detective means 26. However, it should be noted that the position adjusting means 29 is not an essential component.

FIG. 3 is a flowchart showing a method of setting a plurality of reference points S1 to S16 provided within the area on the construction 1 by using the system illustrated in FIG. 1. The present invention illustrated in FIG. 1 will be described below by way of example, with reference to the flowchart in FIG. 2. The below description, however, does not intend to limit applicability of the present invention to buildings or frame structures as illustrated in FIG. 1. The present invention is widely applicable to the surveying of reference points provided on any type of the construction, such as guideway for the traveling track in maglev system over which floating type vehicles travel at high speeds as described above.

At step S101 in FIG. 3, the position adjusting mechanisms 30 is fixed at each reference points S1 to S16 selected within the area on the construction 1, and the target 10 (including the target body 11 and the mounting stage 12 as shown in FIG. 1(B)) is mounted on each of the position adjusting mechanisms 30. As shown in FIG. 5, a fixing hole 50 with a lid 51 may be formed at each reference point S on a horizontal surface F (floor, ceiling, etc.) of the construction 1, and the position adjusting mechanism 30 may be fixed within the fixing hole 50, on a setting plate 52 at the bottom of the hole 50. The target 10 may be divided into the target body 11 and the mounting stage 12, and only the mounting stage 12 is fixed to the position adjusting mechanism 30. In this arrangement, the target body 11 is mounted on the position adjusting mechanism 30 (and the mounting stage 12) when necessary, with open the lid 51 of the fixing hole 50. Except when necessary, the target body 11 is removed from the position adjusting mechanism 30 (and the mounting stage 12) with close the lid 51 of the fixing hole 50, so that the construction surface F being flat (refer to alternate long and short dash lines in FIG. 5).

Alternately, at step S101 in FIG. 3, a setting plate 52 with a fixing screw 53 may be attached at each reference point S on a vertical surface F (wall surface, etc.) of the construction 1, as shown in FIG. 6, and the position adjusting mechanism 30 may be fixed to the setting plate 52 in parallel to the vertical surface F. A casing 54 that covers the position adjusting mechanism 30 may be provided. The target 10 may be divided into the target body 11 and the mounting stage 12, and only the mounting stage 12 is fixed to the position adjusting mechanism 30. The target body 11 may be mounted on the position adjusting mechanism 30 (and the mounting stage 12) when necessary, with open the casing 54. Except when necessary, the target body 11 is removed from the position adjusting mechanism 30 (and the mounting stage 12) with close the casing 54 (refer to an alternate long and short dash line in FIG. 6). As can be seen from FIG. 6, the target 10 does not necessarily have to be disposed above the position adjusting mechanism 30 in the present invention, and a target 10 can be disposed on the side of the position adjusting mechanism 30 by being hanged, for example, with the magnet 15 etc.

FIG. 5 shows an embodiment of the target 10 with the position adjusting mechanism 30 set at each reference point S. The position adjusting mechanism 30 in FIG. 5 includes a mount stage 35 on which the target 10 is mounted, guide stages 31 and 34 that guide the mount stage 35 in X and Y axial directions, respectively, that are parallel to the construction surface F, and feed mechanisms 40a and 40b that slide the mount stage 35 over the guide stages 31 and 34 in X and Y directions, respectively, by predetermined amounts. This combination enables X and Y coordinates of the target 10 to be adjusted in two directions that intersect at right angles and that are parallel to the horizontal surface F of the construction 1.

In FIG. 5, the guide stage 31 is fixed to the setting plate 52 on the construction 1, and lateral guide means 32 and 33 for X axial direction are formed on the upper surface of the guide stage 31 as shown in FIG. 5(D), on which the guide stage 34 is stacked. As shown in FIG. 5(F), the lateral guide means 32 and 33 in the guide stage 31 may be mechanisms for guiding the guide stage 34 in X direction by rotating linear balls 32a and 33a arranged in X direction. Alternatively, as shown in FIG. 5(G), the lateral guide means 32 and 33 in the guide stage 31 may be mechanisms for guiding the guide stage 34 in X direction by engaging projections 32b and 33b with grooves 32c and 33c, respectively, which projections 32b and 33b and grooves 32c and 33c being formed in X direction. As shown in FIGS. 5(A) and 5(C), a protruding part 36 may be formed on a side surface of the guide stage 34.

In the position adjusting mechanism 30 in FIG. 5, lateral guide means 58 and 59 for Y axial direction are formed on the upper surface of the guide stage 34 as shown in FIG. 5(E), on which the mount stage 35 is stacked. As shown in FIG. 5(H), the lateral guide means 58 and 59 in the guide stage 34 may be mechanisms for guiding the mount stage 35 in Y direction by rotating linear balls 58a and 59a arranged in Y direction. Alternatively, as shown in FIG. 5(I), the lateral guide means 58 and 59 in the guide stage 34 may be mechanisms for guiding the mount stage 35 in Y direction by engaging projections 58b and 59b with grooves 58c and 59c, respectively, which projections 58b and 59b and grooves 58c and 59c being formed in Y direction. As shown in FIGS. 5(A) and 5(B), a protruding part 37 may be formed on a side surface of the mount stage 35.

In FIG. 5, two sets of micrometer head serve as the feed mechanisms 40a and 40b of the position adjusting mechanism 30, one of which is supported by a holding part 41a in X axial direction and another of which is supported by a holding part 41b in Y axial direction. As shown in FIG. 5(C), a spindle 42a in the micrometer head 40a for X direction is connected to an abutting part 36a in the protruding part 36 of the guide stage 34. The micrometer head 40a slides the guide stage 34 along the lateral guide means 32 and 33 in steps of 1 μm, by replacing the rotational angle of a screw part 45a with a displacement in X direction through a precise screw mechanism contained in a thimble 43a and by transferring the displacement in X direction to the spindle 42a. When necessary, the feed mechanism 40a may include a clamp 38 for suppressing the guide stage 34 from sliding along the lateral guide means 32 and 33 inadvertently, as shown in FIG. 3(A), which clamp 38 may be released when the guide stage 34 is allowed to slide by the micrometer head 40a. However, the feed mechanism 40a is not limited to a micrometer head, and alternatively the feed mechanism 40a may be a feed screw that can slide the guide stage 34 along the lateral guide means 32 and 33 with high accuracy.

As shown in FIG. 5(B), a spindle 42b in the micrometer head 40b for Y direction is connected to an abutting part 37a in a protruding part 37 of the mount stage 35. The micrometer head 40b slides the mount stage 35 along the lateral guide means 58 and 59 in steps of 1 μm, by replacing the rotational angle of a screw part 45b with a displacement in Y direction through a precise screw mechanism contained in a thimble 43b and by transferring the displacement in Y direction to the spindle 42b. When necessary, the feed mechanism 40b may include a clamp 39 for suppressing the mount stage 35 from sliding along the lateral guide means 58 and 59 inadvertently, as refer to FIG. 5(A), which clamp 39 may be released when the mount stage 35 is allowed to slide by the micrometer head 40b. However, the feed mechanism 40b is not limited to a micrometer head, and alternatively the feed mechanism 40b may be a feed screw that can slide the mount stage 35 along the lateral guide means 58 and 59 with high accuracy.

FIG. 6 shows another embodiment of the target 10 with the position adjusting mechanism 30 fixed at each reference point S. The position adjusting mechanism 30 in FIG. 6 is fixed to the vertical surface F (wall surface, etc.) of the construction 1, as described above, and includes a mount stage 35 on which the target 10 is mounted, a guide stage 31 that guides the mount stage 35 in Z axial direction, i.e. in a parallel with the surface F, and a feed mechanism 40b that slides the mount stage 35 over the guide stage 31 in Z direction by a predetermined amount. This combination enable Z coordinate of the target 10 to be adjusted in a single direction that is parallel to the vertical surface F of the construction 1.

In the position adjusting mechanism 30 in FIG. 6, the guide stage 31, the mount stage 35, and the feed mechanism 40b are the same as those having been described with reference to FIG. 5. Accordingly, as shown in FIG. 6(B), a spindle 42b in the micrometer head 40b is connected to an abutting part 37a in a protruding part 37 of the mount stage 35. The micrometer head 40b slides the mount stage 35 along the lateral guide means 58 and 59 in steps of 1 μm, by replacing the rotational angle of the screw part 45b with a displacement in Z direction through a precise screw mechanism contained in a thimble 43b and by transferring the displacement in Z direction to the spindle 42b. When necessary, the feed mechanism 40b may include a clamp 39 for suppressing the mount stage 35 from sliding along the lateral guide means 58 and 59 inadvertently.

Return to the flowchart in FIG. 3, at step S101, the targets 10 with the position adjusting mechanism 30 are installed and fixed at all the reference points S within the area on the construction 1, and then the initial 3D coordinates C0 of the target 10 at each reference point S are surveyed at steps S102. FIG. 4 shows a detailed flowchart for surveying the initial 3D coordinates C0 of the target 10 at each reference point S, corresponding to step S102 in FIG. 3. First, at step S201 in FIG. 4, a first polygon G1 that has apexes at three or more of the reference points S within the area is selected. At step S202, the 3D measuring instrument 18 is installed at a central site O where all the apexes of the first polygon G1 are viewable. As shown in FIG. 1, for example, the first polygon G1 that has apexes at the six reference points S1 to S6 is selected, and the 3D measuring instrument 18 is installed at the central site O where the apexes S1 to S6 of the first polygon G1 are viewable.

Next, at step S203 in FIG. 4, the 3D measuring instrument 18 collimates the targets 10 at the apexes S1 to S6 of the first polygon G1, and obtains 3D vectors for the targets 10. Then, the 3D measuring instrument 18 transfers the obtained 3D vectors for the apexes S1 to S6 into the coordinate measuring means 23 in the surveying means 22 of the computer 20. The coordinate measuring means 23 measures, from the received 3D vectors from the 3D measuring instrument 18, 3D coordinates of the reference points S1 to SE in the first polygon G1, for example, in a predetermined coordinate system that has an origin at the installation location O of the measuring instrument 18. The origin of the predetermined coordinate system is not limited to the installation location O; alternatively, for example, the origin may be the reference point S1.

To give an example, 3D vector for the reference point S1 may be obtained by: removing a target body 11 from amounting stage 12 at the reference point S1; moving the target body 11 toward the measuring instrument 18 at the central location O and causing the measuring instrument 18 to collimate the target body 11; and then moving the target body 11 away from the measuring instrument 18 while causing the measuring instrument 18 to automatically collimate (track) the target body 11 until the target body 11 returns to the mounting stage 12 at the reference point S1. To give another example, 3D vector for the reference point S1 can be obtained by: inputting, into the measuring instrument 18, the rough 3D coordinates of the reference point S1 which have been selected on the basis of a design drawing or the like; and causing the measuring instrument 18 to automatically collimate the target body 11 mounted on the mounting stage 12. A method of obtaining 3D vectors for the other reference points S2 to S6 may also be the same.

After that, the processing proceeds to step S204 in FIG. 4, and an n-th polygon G(n) (n being an integer of 2 or more) is selected which has apexes at three or more of the reference points within the area on the construction 1 whose coordinates have been measured and one or more of the reference points whose coordinates have not been measured. At step S205, the 3D measuring instrument 18 is moved to a central site P(n) where all the apexes of the n-th polygon G(n) are viewable. For example, as shown in FIG. 1, a second polygon G2 is selected which has apexes at three reference points S4, S5 and S6 whose coordinates have been measured and three reference points S7, S8 and S9 whose coordinates have not been measured, and the 3D measuring instrument 18 is moved to a central site P1 where the apexes S4 to S9 of the second polygon G2 are viewable. As illustrated, the second polygon G2 can adjoin the first polygon G1, and three or more reference points in the second polygon G2 whose coordinates have been measured can coincide with the three or more reference points S4, S5 and S6 of an adjacent polygon (e.g., first polygon G1).

At step S206, the 3D measuring instrument 18 collimates the targets 10 at the apexes S4 to S9 of the second polygon G2 to obtain 3D vectors for the apexes S4 to S9, and transfers the obtained 3D vectors for the apexes S4 to S9 into the coordinate measuring means 23. The coordinate measuring means 23 firstly handles 3D vectors for three reference points S4, S5 and S6 whose coordinates have been measured, out of the received 3D vectors, and measures 3D coordinate of the post-movement location P1 by resection (backward intersection) to which the measuring instrument 18 has been moved, in a coordinate system that has an origin at the location O. The resectdion (backward intersection) refers to a surveying technique for determining new unknown coordinates (post-movement location P1 in this case) from three or more known coordinates (reference points S4, S5 and S6 in this case).

At step S207, the coordinate measuring means 23 then handles 3D coordinates of the post-movement location P1 and 3D vectors for three reference points S7, S8 and S9 whose coordinates have not been measured, and thereby measures 3D coordinates of the reference points S7, S8 and S9 in the predetermined coordinate system (that is the same as the coordinate system for the reference points S1 to S6 in the first polygon G1). In obtaining 3D vectors at steps S206 and S207, a target body 11 may be removed from a mounting stage 12 and be automatically collimated (tracked) by the measuring instrument 18, or a target body 11 may remain on the mounting stage 12 and be automatically collimated (tracked) by the measuring instrument 18, whereby 3D vectors for the reference points S7, S8 and S9 can be obtained.

After that, at step S208, it is judged whether or not the measurement of 3D coordinates of all the reference points S within the area on the construction 1 have been completed. In case any reference point whose coordinates have not been measured is left on the construction 1, the processing returns to step S204, and the above-described processes from steps S204 to S207 are repeated. As shown in FIG. 1, for example, a third polygon G3 is selected which has apexes at three reference points S7, S8 and S9 whose coordinates have been measured and four reference points S10, S11, S12 and S13 whose coordinates have not been measured. Then, the 3D measuring instrument 18 is moved to a central site P2 where the apexes S7 to S13 of the third polygon G3 are viewable (steps S204 and S205).

As shown in FIG. 1, the third polygon G3 may adjoin the second polygon G2, and the three or more reference points in the third polygon G3 whose coordinates have been measured may coincide with the three or more reference points S7, S8 and S9 in an adjacent polygon (e.g., second polygon G2). The 3D measuring instrument 18 collimates the targets 10 at the apexes S7 to S13 in the third polygon G3 to obtain 3D vectors for the apexes S7 to S13. The coordinate measuring means 23 firstly measures 3D coordinates of the post-movement location P2 of the measuring instrument 18 by resection, from 3D vectors for the reference points S7, S8 and S9 whose coordinates have been measured. The coordinate measuring means 23 then measures 3D coordinates of the reference points S10, S11, S12 and S13 whose coordinates have not been measured, from 3D coordinates of the post-movement location P2 and 3D vectors for the reference points S10, S11, S12 and S13, in the predetermined coordinate system (that is the same as the coordinate system for the reference points S1 to S9) (steps S206 and S207).

Further, as shown in FIG. 1, the fourth polygon G4 is selected which has apexes at four reference points 81, S11, S12 and S13 whose coordinates have been measured and three reference points S14, S15 and S16 whose coordinates have not been measured. Then, the 3D measuring instrument 18 is moved to a central site P3 where the apexes 81 and S11 to S16 in the fourth polygon G4 are viewable (steps S204 and S205). The 3D measuring instrument 18 collimates the targets 10 at the apexes S1 and S11 to S16 of the fourth polygon G4 to obtain 3D vectors for the apexes S1 and S11 to S16. The coordinate measuring means 23 firstly measures 3D coordinates of the post-movement location P3 of the measuring instrument 18 by resection, from 3D vectors for the reference points S1, S11, S12 and S13. The coordinate measuring means 23 then measures 3D coordinates of the reference points S14, S15 and S16 whose coordinates have not been measured, from 3D coordinates of the post-movement location P3 and 3D vectors for the reference points S14, S15 and S16 (steps S206 and S207).

As shown in FIG. 1, the polygons G1 to G4 are desirably selected such that all the polygons G1 to G4 are sequentially arranged adjacent to one another in a closed loop shape. The flowchart in FIG. 4 may applicable to the polygons G1 to G4 which are arranged in an opened line shape, however, such arrangement makes it difficult to check the measurement results for the reference points S1 to S16, possibly result in unexpected errors in 3D coordinates of the reference points S1 to S16. The polygons G1 to G4 are preferably sequentially arranged so as to adjoin one another such that one or more of the reference points S are shared, and so as to form a closed loop shape such that the last fourth polygon G4 and the first polygon G1 share one or more of the reference points S (reference point S1 in the illustrative example). This arrangement facilitates the check of the measurement accuracy for each reference point S in steps S209 and S210, as will be described below (refer to EMBODIMENT 3).

In FIG. 4, the completion of the measurement of 3D coordinates of all the reference points S1 to S16 within the area on the construction 1 at step S208 comes to step S212. At step S212, initial 3D coordinates C0 of the reference points S1 to S16 are determined through the network-adjustment calculation based on the measured coordinates of all the reference points S1 to S16. More specifically, as 3D coordinates measured from the 3D vectors output from the 3D measuring instrument 18 are approximate values containing errors, network-adjustment calculation means 25 in the surveying means 22 in the computer 20 determines initial 3D coordinates C0 by using the method of least-squares, such that errors contained in 3D coordinates of all the reference points S are minimized. The network-adjustment calculation refers to the method of least-squares in surveying which minimizes an error contained in 3D coordinates as described above (Please refer to Non-patent Document No. 1).

If one of the plurality of reference points S1 to S16 (e.g., reference point S1) can be regarded as a fixed point, initial 3D coordinates C0 of the reference points S1 to S16 may be determined through fixed-network adjustment calculation, in which the measured 3D coordinate of the reference point S1 is fixed and errors contained in 3D coordinates of other reference points S2 to S16 are minimized. Alternatively, if none of the reference points S1 to S16 is regarded as a fixed point, initial 3D coordinates C0 of the reference points S1 to S16 may be determined through free-network adjustment calculation, in which none of the measured 3D coordinate is fixed and errors contained in 3D coordinates of all reference points S1 to S16 are minimized. After step S212 (step S102 in FIG. 3), the determined initial 3D coordinates C0 of all the targets 10 at the reference points S may be stored in the storage means 21 in the computer 20 (step S103 in FIG. 3).

According to the flowchart in FIG. 4, even if a partition 6 that restricts viewing is present on the construction 1, as shown in FIG. 9, it is possible to measure 3D coordinates of the plurality of reference points S that spread across the spaces 2, 3 and 4 divided by the partition 6 on the construction 1, in the same coordinate system. Such method for surveying reference points S on the construction 1, where partition 6 that restricts viewing is present, will be described below (refer to EMBODIMENT 2). Further, according to the flowchart in FIG. 4, a check calculation means 24 in the surveying means 22 in the computer 20 can check whether or not 3D coordinate of all the reference points S1 to S16 have been measured correctly by the 3D measuring instrument 18, prior to the network-adjustment calculation in step S212 (step S209 to step S211 in FIG. 4). Such check calculation will also be described below (refer to EMBODIMENT 3). However, the method for surveying initial 3D coordinates C0 of each target 10, is not limited to the flowchart in FIG. 4, and the initial 3D coordinates C0 of each target 10 may be surveyed by other suitable conventional method.

Return to the flowchart in FIG. 3, after surveying and storing of the initial 3D coordinates C0 of the target 10 at each reference point S are completed, the large-sized apparatuses 5 are carried in the area on the construction 1 and installed at required locations at step S104. While carrying and installing the large-sized apparatuses 5, stresses due to heavy loads of the apparatuses 5 may cause deformation or distortion of the construction 1, and may cause displacement of the initial locations C0 of the reference points S, which results in an risk of error in measuring the installed location of the apparatuses 5 using the reference points S on the construction 1. In FIG. 3, steps S105 and S106 indicate a process for re-surveying 3D coordinates Ct of the reference points S1 to S16 after an event t that may cause deformation or distortion of the construction 1, and recovering the initial 3D coordinates C0 of the reference points S1 to S16 if a deviation $\Delta C$ is generated between 3D coordinates Ct and the initial 3D coordinates C0.

In FIG. 3, step 3105 indicates a process through which the surveying means 22 in the computer 20 re-surveys 3D coordinates Ct of the targets 10, in accordance with the flowchart in FIG. 4, and step S106 indicates a process through which the deviation detecting means 26 in the computer 20 detects the deviations $\Delta C$ (=Ct−C0) of 3D coordinates Ct of the targets 10 from the corresponding initial 3D coordinates C0 stored at step S103. In case the fixed-network adjustment calculation is employed at step 212 in FIG. 4, the deviations $\Delta C$ for the reference points S2 to S16, i.e. other than a reference point regarded as fixed, can be detected at step S106. Incase the free-network adjustment calculation is employed at step 212 in FIG. 4, the deviations $\Delta C$ for all the reference points S1 to S16 can be detected at step S106.

In FIG. 3, step S107 indicates a process for recovering the initial 3D coordinates C0 of the reference points S1 to S16 by using the position adjusting mechanism 30 at the reference points S1 to S16, in which the targets 10 at the reference points S1 to S16 move in accordance with the corresponding detected deviations $\Delta C$. For example, when the deviations $\Delta X$ and $\Delta Y$ in X and Y directions are detected at a reference point S to which the position adjusting mechanism 30 in FIG. 5 is fixed, the feed mechanisms 40a and 40b slide the guide stage 34 and the mount stage 35 in X and Y directions by −ΔX and −ΔY, respectively. This enables the target 10 on the mount stage 35 to recover its initial 3D coordinates C0. When the deviation ΔZ in Z direction is detected at a reference point S to which the position adjusting mechanism 30 in FIG. 6 is fixed, the feed mechanism 40b slides the mount stage 35 in Z direction by −ΔZ, thereby enabling the target 10 on the mount stage 35 to recover its initial 3D coordinates C0.

Each reference point S in FIG. 5 aims to adjust or recover its location in two axial directions (X and Y directions) that intersect at right angles each other in parallel to the horizontal surface F of the construction 1, and therefore the position adjusting mechanism 30 in FIG. 5 is not required to have a function for adjusting position in Z direction. And each reference point S in FIG. 6 aims to adjust or recover its location in a single axial direction (Z direction) that is parallel to the vertical surface F of the construction 1, and therefore the position adjusting mechanism 30 in FIG. 6 is not required to have a function for adjusting position in X and Y directions. However, if necessary, the position adjusting mechanism 30 having a function for adjusting position in three axial directions (X, Y and Z directions) can be provided at a reference point S which aims to adjust its location in three axial directions, by combining the mechanism in FIG. 5 and the mechanism in FIG. 7 that will be described below (refer to EMBODIMENT 1).

In FIG. 1, the position adjusting means 29 is connected to the computer 20 for controlling the position adjusting mechanisms 30 at each of the reference points S1 to S16. And therefore, at step S107 in FIG. 3, it is possible to automatically control the position adjusting mechanisms 30 at the reference points S1 to S16 in accordance with the detected deviations ΔC, for example, through converting the detected deviations ΔC into control signals by the position adjusting means 29 and transmitting the corresponding control signals to the position adjusting mechanisms 30 at the reference points S1 to S16.

By using the reference points S1 to S16 that have recovered the initial 3D coordinates C0 at step S107 in FIG. 3, an error in measuring the installed location of the large-sized apparatuses 5 on the construction 1 can be checked and detected whether or not being within an acceptable range (tolerance of at most 10 μm to 100 μm), even when the construction 1 is deformed or distorted by heavy load of the large-sized apparatuses 5. This enables the reliable adjustment of the locations (alignment) of the plurality of large-sized apparatuses 5 on the construction 1. If the error in measuring the installed location falls outside the acceptable range, the processing returns to step S104 from step S108, and the large-sized apparatus 5 can be relocated. As the relocation of the large-sized apparatuses 5 may cause another deformation or distortion of the construction 1, the error in the relocation of the large-sized apparatuses 5 on the construction 1 can be checked and detected whether or not being within an acceptable range after the reference points S1 to S16 have recovered the initial 3D coordinates C0 at steps S105 and S106. Installing the large-sized apparatuses 5 while repeating steps S104 to 108 described above can enhance the reliability of a work for installing the large-sized apparatuses 5 on the construction 1.

According to the flowchart in FIG. 3, it is possible to make the reference points S stable or resistant against deformation or distortion of the construction 1 by recovering the initial 3D coordinates C0, not only when the construction 1 is deformed or distorted by heavy load of the large-sized apparatuses 5, but also when the construction 1 is deformed or distorted by earthquakes, or drying shrinkage in concrete, or environmental shrinkage/expansion of concrete, etc. In other words, even when the construction 1 is deformed or distorted after the reference points S have been set on the construction 1 for some reasons as described above, it is possible to make accurate location adjustments on the construction 1 using the reference points S that have recovered their initial 3D coordinates C0 in advance. In addition, when devices and apparatuses that have been installed on the construction 1 are displaced due to deformation or distortion of the construction 1, it is also possible to check and grasp accurately the displacements of the devices and apparatuses before and after the occurrence of deformation or distortion by using the reference points S that have recovered their initial 3D coordinates C0, and to readjust the locations (alignments) of the devices and apparatuses easily and efficiently.

Thus, the object of the present invention, namely to provide a method and system for setting reference points on construction which are usable for accurate adjustment or alignment on the construction even when deformation or distortion of the construction occurs has been fulfilled.

Embodiment 1

FIG. 7 shows another embodiment of the target 10 with the position adjusting mechanism 30 to be set at each reference point S. The position adjusting mechanism 30 in FIG. 7 includes amount stage 68 on which the target 10 is mounted, guide stages 61 and 62 that guide the mount stage 68 in Z axial direction, that is vertical to the construction surface F, and a feed mechanism 40c that moves the mount stage 68 on the guide stages 61 and 62 upward or downward in Z direction by predetermined amount. These components enable Z coordinate of the target 10 to be adjusted in a single direction that is vertical to the construction surface F. The target 10 in FIG. 7 includes the target body 11 and the mounting stage 12, but only the mounting stage 12 is necessary to be fixed to the position adjusting mechanism 30. The target body 11 may be mounted on the position adjusting mechanism 30 (the mounting stage 12) when necessary.

In the position adjusting mechanism 30 in FIG. 7, the guide stage 61 is fixed to a setting plate 52, and lateral guide means 63 and 64 for X direction and a vertical guide means 67 for Z direction are formed on the upper surface of the guide stage 61 (see FIGS. 7(B) and (C)). In addition, the guide stage 62 is stacked on the guide stage 61. The lateral guide means 63 and 64 in the guide stage 61 may be mechanisms for guiding the guide stage 62 in X direction by rotating linear balls 63a and 64a arranged in X direction (refer to FIG. 7(B)). Alternatively, the lateral guide means 63 and 64 may be mechanisms for guiding the guide stage 62 in X direction by engaging projections 63b and 64b with grooves 63c and 64c, the projections 63b and 64b and grooves 63c and 64c being formed in X direction (refer to FIG. 7(C)). The vertical guide means 67 passes through a through-hole provided in the guide stage 62, and is coupled to the mount stage 68 stacked on the guide stage 62.

In the position adjusting mechanism 30 in FIG. 7, the upper surface of the guide stage 62 is inclined in X axial direction at a preset angle, and the lateral guide means 65 and 66 for X direction are formed on the inclined upper surface of the guide stage 62 (refer to FIGS. 7(B) and (C)). In addition, the bottom surface of the mount stage 68 is inclined in X direction at the same preset angle as the upper surface of the guide stage 62, and is stacked on the inclined upper surface of the guide stage 62. Guide means 65 and 66 in the guide stage 62 may be mechanisms for guiding the mount stage 68 in X direction by rotating linear balls 65a and 66a arranged in X direction (refer to FIG. 7(B)). Alternatively, the guide means 65 and 66 can be mechanisms for guiding the mount stage 68 in X direction by engaging projections 65b and 66b with grooves 65c and 66c, the projections 65b and 66b and the grooves 65c and 66c being formed in X direction (refer to FIG. 7(C)). The guide stage 62 is provided with the through-hole for the vertical guide means 67, as described above, and therefore can slide in X direction along the lateral guide means 63, 64, 65 and 66 while being penetrated by the vertical guide means 67. The mount stage 68 that is coupled to the vertical guide means 67 is configured to move upward or downward in Z direction by sliding along the inclined upper surface of the guide stage 62 when the guide stage 62 slides in X direction.

The position adjusting mechanism 30 in FIG. 7 includes a micrometer head served as the feed mechanism 40c, which is supported by a holding part 41c in X direction, as in the cases shown in FIGS. 5 and 6. A spindle 42c in the micrometer head 40c in FIG. 7 is connected to a protruding part 69 in the guide stage 62, and slides the guide stage 62 in X direction along the lateral guide means 63, 64, 65 and 66 by replacing the rotational angle of a screw part 45c with a displacement in X direction through a precise screw mechanism contained in the thimble 43c and transmitting the displacement to the spindle 42c. In response to the sliding of the guide stage 62, the mount stage 68 can move upward or downward in Z direction in steps of 1 μm. The feed mechanism 40c may include a clamp if necessary.

For example, when a deviation ΔZ in Z direction is detected at step S107 in FIG. 4, the position adjusting mechanism 30 in FIG. 7 can be used to make the target 10 on the mount stage 68 to recover its initial 3D coordinates C0 by moving the mount stage 68 upward or downward in Z direction by −ΔZ through the feed mechanism 40c. Moreover, a position adjusting mechanism 30 that can adjust the location of the target 10 in three intersecting axial directions (X, Y and Z directions) may be configured by combining the position adjusting mechanisms 30 in FIG. 7 and that in FIG. 5.

Furthermore, as indicated by an alternate long and short dash line in FIG. 7, a digital level 70 that emits laser light laterally while rotating may be mounted on the mount stage 68 in the position adjusting mechanism 30, instead of the target 10. This can configure the digital level that enables its height to be adjusted in Z direction in steps of 1 μm. Lateral emission light (marking) of the digital level has been conventionally utilized to install devices and apparatuses within a construction 1, so as to enhance the efficiency of the work for installing devices and apparatuses. However, as the digital levels in which the height of emitted laser light (marking height) is accurately adjustable have not yet been developed, it is difficult to apply the digital levels to works for installing large-sized apparatuses 5, such as a high energy accelerator device, a proton beam therapy device, or a particle beam therapy device, etc., with high accuracy, the tolerance being about 10 μm to 100 μm. Mounting the digital level 70 on the position adjusting mechanism 30 that enables its height in steps of 1 μm makes it possible to emit laser light laterally, the height of which is adjusted accurately, and apply the digital levels to works for installing large-sized apparatuses 5 with high accuracy, thereby enhancing the efficiency of works for installing the large-sized apparatuses 5 on the construction 1.

Embodiment 2

FIG. 2 shows another embodiment according to the present invention, in which a partition 6 that restricts viewing is present on the construction 1, and 3D coordinates of reference points S on either side of the partition 6 are surveyed in the same coordinate system. According to the flowchart in FIG. 4, from step S204 to step S207, the n-th polygon G(n) is required to be selected to includes three or more of the reference points whose coordinates have been measured and one or more of the reference points whose coordinates have not been measured, and the 3D measuring instrument 18 is required to be installed or moved at a central site P(n) of the n-th polygon G(n) where all the reference points in the n-th polygon G(n) are viewable. In case the partition 6 that restricts viewing is present on the construction 1, between spaces 2 and 3 (or between spaces 2 and 4) in FIG. 9 for example, reference points on one side of the partition 6 (in the space 2) are not viewable from the opposite side of the partition 6 (the space 3 or 4), and a polygon G(n) that extends over the partition 6 cannot be selected. In FIG. 2, a polygon G(m) that extends over the partition 6 can be selected by the way of forming at least one through-hole 7 in the partition 6.

The embodiment of FIG. 2 will be described below with reference to the flowchart in FIG. 4. In FIG. 2, steps S204 to S207 in FIG. 4 are repeatedly applied to one side of the partition 6 (the space 2 on the left side of the partition), whereby 3D coordinates of all the reference points S on the one side of the partition 6 (reference points S21 to S30 in FIG. 2) are measured from 3D vectors output from the 3D measuring instrument 18. For example, (m−1)th polygon G(m−1) may be selected on the one side of the partition 6 which has apexes at three reference points S23 to S25 whose coordinates have been measured and four reference points S27 to S30 whose coordinates have not been measured. Then, the 3D measuring instrument 18 is moved to a central site P(m−1) where the apexes S23 to S30 of the (m−1)th polygon G(m−1) are viewable (steps S204 and S205). The 3D measuring instrument 18 collimates the targets 10 at the apexes S23 to S30 in the (m−1)th polygon G(m−1) to obtain the 3D vectors for the apexes S23 to S30. The coordinate measuring means 23 firstly measures 3D coordinates of the post-movement location P(m−1) of the measuring instrument 18 by resection, from 3D vectors for the reference points S23 to S25. The coordinate measuring means 23 then measures 3D coordinates of the reference points S27 to S30 whose coordinates have not been measured, from 3D coordinates of the post-movement location P(m−1) and 3D vectors for the reference points S27 to S30 (steps S206 and S207).

After that, the 3D measuring instrument 18 is moved to a central site in an m-th polygon G(m) (m being an integer of 2 or more) on the opposite side of the partition 6 (the space 3 on the right side of the partition). At the central site in the m-th polygon G(m), three or more reference points S (e.g., the reference points S28, S29 and S30) on the one side of the partition 6 whose coordinates have been measured are viewable via the through-hole 7 formed in the partition 6. The coordinate measuring means 23 measures 3D coordinates of the reference points S (e.g., the reference points S31, S32, S33 and S34) in the m-th polygon on the opposite side of the partition 6 whose coordinates have not been measured, from 3D vectors output from the measuring instrument 18.

More specifically, the m-th polygon G(m) is selected which has apexes at three reference points S28 to S30 whose coordinates have been measured and four reference points S31 to S34 whose coordinates have not been measured.

Then, the 3D measuring instrument 18 is moved to a central site P(m) in an m-th polygon G (m) where the apexes S28 to S30 are viewable via the through-hole 7 and the apexes S31 to S34 are viewable (steps S204 and S205). The 3D measuring instrument 18 collimates the targets 10 at the apexes S28 to S34 in the m-th polygon G (m) to obtain the 3D vectors for the apexes S28 to S34. The coordinate measuring means 23 firstly measures 3D coordinates of the post-movement location P(m) of the measuring instrument 18 on the opposite side of the partition 6 by resection, from 3D vectors for the reference points S28 to S30 on the one side of the partition 6 whose coordinates have been measured. The coordinate measuring means 23 then measures 3D coordinates of the reference points S31 to S34 on the opposite side of the partition 6 whose coordinates have not been measured, from 3D coordinates of the post-movement location P (m) and 3D vectors for the reference points S31 to S34 (steps S206 and S207).

According to the method of viewing reference points S whose coordinates have been measured via the through-hole 7 formed in the partition 6, as shown in FIG. 2, 3D coordinates of the plurality of reference points S on the construction 1 can be surveyed in the same coordinate system in accordance with the flowchart in FIG. 4, regardless of the presence or absence of the partition 6. This makes it possible to measure 3D coordinates of the plurality of reference points S that spread across the spaces 2, 3 and 4, for example, as shown in FIG. 9, in the same coordinate system, and to adjust the locations of the plurality of large-sized apparatuses 5 (e.g. accelerator 5a, conveying pipe line 5b, radiation apparatus 5c, treatment table 5d, etc.) to be installed separately from one another within different spaces on the construction 1 with high accuracy.

Embodiment 3

In FIG. 4, steps S209 to S211 indicate a process for checking by a check calculation means 24 in the surveying means 22 in the computer 20, in which 3D coordinate of all the reference points S1 to S16 are checked whether or not have been measured correctly by the 3D measuring instrument 18, prior to the network-adjustment calculation in step S212. The measurement accuracy for the reference points S1 to S16 may be checked by calculating inter-reference-point vectors corresponding to outer sides of each polygon G in the area on the construction 1 from 3D vectors of the apexes of each polygon, and determining the coordinate misclosure (error of closure) of each polygon G1 to G4 from the inter-reference-point vectors thereof. Alternatively, the check may be performed by determining the coordinate misclosure of smallest-polygon surrounded by plural polygons (e.g. the interior polygon surrounded by plural polygons G1 to G4 having apexes at the reference points S1, S6, S5, S9, S13 and S16 in FIG. 1).

The coordinate misclosure of each polygon G(k) (e.g. second polygon G2) is the sum of the inter-reference-point vectors obtained when starting at a specified reference point S1 (e.g., reference point S4) in the polygon G(k) and going around its outer sides while sequentially adding up the inter-reference-point vectors for the surrounding sides (i.e., the coordinate misclosure of the second polygon G2=(S4 to S6)+(S6 to S5)+(S5 to S9)+(S9 to S8)+(S8 to S7)+(S7 to S4)). In this case, it is not possible to check the measurement accuracy for the reference points by adding up the inter-reference-point vectors for itself of each polygon G obtained from 3D vectors for apexes collimated by the 3D measuring instrument 18 at the central site in it, because sum of such inter-reference-point vectors of each polygon becomes theoretically zero (=0). For this reason, as shown in FIG. 1, the polygons G(k) are sequentially arranged in a loop shape such that one or more of the reference points S are shared. Then, the coordinate misclosure for each polygon G(k) is calculated while one or more inter-reference-point vectors shared by each pair of the polygons which adjoin each other, namely the polygon G(k) and its adjacent polygon G(k−1) or G(k+1), are mutually replaced.

FIG. 8 shows an example of calculation of the coordinate misclosure of each polygon, assuming that 3D coordinates of all the reference points S on the construction 1 have been measured, the apexes S4, S5 and S6 are shared by both the n-th polygon G(n) and the (n−1)th polygon G(n−1), and the apexes S7, S8 and S9 are shared by both the n-th polygon G(n) and the (n+1)th polygon G (n+1). At step S209 in FIG. 4, inter-reference-point vectors (S4 to S5, S4 to S6, and S5 to S6) for the n-th polygon G(n) are replaced with inter-reference-point vectors for the (n−1)th polygon G(n−1), and inter-reference-point vectors (S7 to S8, S7 to S9, and S8 to S9) for the (n+1)th polygon G(n+1) are replaced with the n-th polygon G(n). Furthermore, at step S210, the coordinate misclosure of the n-th polygon G(n), i.e. the sum of the inter-reference-point vectors (=(S4 to S6)+(S6 to S5)+(S5 to S9)+(S9 to S8)+(S8 to S7)+(S7 to S4)) around the n-th polygon G(n) is calculated. At step S211, it is determined whether or not the calculated misclosure exceeds an preset acceptable value (e.g., 0.1 mm=100 μm).

Likewise, the misclosure of all polygon G(n) within the area on the construction 1 are checked and calculated, while one or more inter-reference-point vectors shared by each of the polygons G(n) and its adjacent polygon G(n−1) or G(n+1) are mutually replaced, and determined whether or not the misclosure exceeds the acceptable value (step S211). If the misclosure of any one of the polygons exceeds the acceptable value, it is determined that the measurement of 3D coordinates by the measuring instrument 18 contains error, resulting in the return to steps S201 or S204 and the re-measurement of 3D coordinates of the reference points. In the case of returning to step S204, each polygon from which the error has been detected will be re-measured. In the case of returning to step S201, all of the polygons will be re-measured from the beginning. The check calculation at steps S209 to S211, performed in this manner, makes it possible to find poor measurement of 3D coordinates of the reference points before the network-adjustment calculation at step S212, and avoid erroneous measurement in advance.

| Reference Numerals | |
|---|---|
| 1 . . . construction (building) | 2, 3, 4 . . . space (room) |
| 5 . . . large-sized apparatus | 5a . . . accelerator |
| 5b . . . conveying pipe line | 5c . . . radiation apparatus |
| 5d . . . treatment table | 6 . . . partition |
| 7 . . . through-hole | 10 . . . target |
| 11 . . . target body | 12 . . . mounting stage |
| 14 . . . hemispherical groove | 15 . . . magnet |
| 18 . . . 3D measuring instrument | 20 . . . computer |
| 21 . . . storage means | 22 . . . surveying means |
| 23 . . . coordinate measuring means | 24 . . . check calculation means |
| 25 . . . network-adjustment calculation means | |
| 26 . . . deviation detecting means | |
| 28 . . . output device (display) | 29 . . . position adjusting means |
| 30 . . . position adjusting mechanism | 31, 34 . . . guide stage |
| 32, 33 . . . (lateral) guide means | 35 . . . mount stage |
| 36, 37 . . . protruding part | 36a, 37a . . . abutting part |
| 38, 39 . . . clamp | 58, 59 . . . (lateral) guide means |
| 40 . . . feed mechanism | 41 . . . holding part |
| 42 . . . spindle | 43 . . . thimble |
| 44 . . . sleeve | 45 . . . screw part |

-continued

Reference Numerals

| | |
|---|---|
| 47 . . . reading scale | 50 . . . fixing hole |
| 51 . . . lid | 52 . . . setting plate |
| 53 . . . fixing screw | 54 . . . casing |
| 61, 62 . . . guide stage | 63, 64 . . . (lateral) guide means |
| 65, 66 . . . (lateral) guide means | 67 . . . (vertical) guide means |
| 68 . . . mount stage | 69 . . . protruding part |
| 69a . . . abutting part | 70 . . . digital level |
| Ct . . . (after strain occurrence)3D coordinates | |
| C0 . . . initial 3D coordinates | |
| F . . . construction surface | G . . . polygon |
| S . . . reference point | P . . . post-movement location |

The invention claimed is:

1. Method for setting reference points on construction comprising the steps of:
fixing a position adjusting mechanism with a target mounted thereon at a plurality of reference points respectively on a construction;
surveying and storing initial 3D coordinates of the targets;
detecting a deviation of 3D coordinate of each of the targets from the initial 3D coordinate thereof when deformation or distortion of the construction occurs; and
recovering the initial 3D coordinate of each of the targets by the position adjusting mechanism thereof in accordance with the detected deviation.

2. Method for setting reference points on construction according to claim 1, wherein 3D coordinates of the targets are surveyed by a 3D measuring instrument which collimates the targets to output 3D vectors for the targets.

3. Method for setting reference points on construction according to claim 1, wherein each of the targets includes a target body having a spherical or hemispherical outer shell, and a mounting stage with a hemispherical groove into which the outer shell of the target body removably fits.

4. Method for setting reference points on construction according to claim 2, wherein each of the targets includes a target body having a spherical or hemispherical outer shell, and a mounting stage with a hemispherical groove into which the outer shell of the target body removably fits.

5. Method for setting reference points on construction according to claim 3, wherein each of the position adjusting mechanism includes guide stage for guiding the target mounted thereon in a direction or in two directions that intersect at right angle, the direction or directions parallel to a surface of the construction; and feed mechanism for sliding the target on the guide stage in predetermined amount.

6. Method for setting reference points on construction according to claim 4, wherein each of the position adjusting mechanism includes guide stage for guiding the target mounted thereon in a direction or in two directions that intersect at right angle, the direction or directions parallel to a surface of the construction; and feed mechanism for sliding the target on the guide stage in predetermined amount.

7. Method for setting reference points on construction according to claim 3, wherein each of the position adjusting mechanism includes guide stage for guiding the target mounted thereon in a direction vertical to a surface of the construction; and feed mechanism for moving the target on the guide stage upward or downward in predetermined amount.

8. Method for setting reference points on construction according to claim 4, wherein each of the position adjusting mechanism includes guide stage for guiding the target mounted thereon in a direction vertical to a surface of the construction; and feed mechanism for moving the target on the guide stage upward or downward in predetermined amount.

9. System for setting reference points on construction comprising:
respective position adjusting mechanisms with respective targets mounted thereon to be fixed at a plurality of reference points on a construction;
a 3D measuring instrument for collimating the targets to output 3D vectors for the targets;
a surveying means for receiving 3D vectors output from the 3D measuring instrument for surveying 3D coordinates of the targets;
a storage means for storing initial 3D coordinates of the targets; and
a deviation detecting means for detecting a deviation of 3D coordinate of each of the targets from the initial 3D coordinate thereof when deformation or distortion of the construction occurs,
whereby each of the targets recovers the initial 3D coordinate by the position adjusting mechanism thereof in accordance with the detected deviation.

10. System for setting reference points on construction according to claim 9, wherein the 3D measuring instrument is a laser tracker or a 3D total station.

11. System for setting reference points on construction according to claim 9, wherein each of the targets includes a target body having a spherical or hemispherical outer shell, and a mounting stage with a hemispherical groove into which the outer shell of the target body removably fits.

12. System for setting reference points on construction according to claim 10, wherein each of the targets includes a target body having a spherical or hemispherical outer shell, and a mounting stage with a hemispherical groove into which the outer shell of the target body removably fits.

13. System for setting reference points on construction according to claim 11, wherein each of the position adjusting mechanism includes guide stage for guiding the target mounted thereon in a direction or in two directions that intersect at right angle, the direction or directions parallel to a surface of the construction; and feed mechanism for sliding the target on the guide stage in predetermined amount.

14. System for setting reference points on construction according to claim 12, wherein each of the position adjusting mechanism includes guide stage for guiding the target mounted thereon in a direction or in two directions that intersect at right angle, the direction or directions parallel to a surface of the construction; and feed mechanism for sliding the target on the guide stage in predetermined amount.

15. System for setting reference points on construction according to claim 11, wherein each of the position adjusting mechanism includes guide stage for guiding the target mounted thereon in a direction vertical to a surface of the construction; and feed mechanism for moving the target on the guide stage upward or downward in predetermined amount.

16. System for setting reference points on construction according to claim 12, wherein each of the position adjusting mechanism includes guide stage for guiding the target mounted thereon in a direction vertical to a surface of the construction; and feed mechanism for moving the target on the guide stage upward or downward in predetermined amount.

17. Target for setting reference points on construction comprising:
   a opening type fixing case or a fixing hole with a lid that is formed at a reference point on a construction,
   a position adjusting mechanism being fixed within the case or the fixing hole; and
   a target to be mounted on the position adjusting mechanisms,
   wherein the position adjusting mechanism includes guide stage on which at least one guide means is formed in a predetermined direction and a micrometer head for sliding the target along the guide means on the guide stage in steps of 1 μm,
   whereby the target is able to recover a initial 3D coordinate by the position adjusting mechanism when deformation or distortion of the construction occurs, in accordance with a deviation between the initial 3D coordinate and such 3D coordinate of the target that surveyed after the deformation or distortion of the construction with open the case or the lid of the fixing hole.

18. Target for setting reference points on construction according to claim 17, wherein the targets includes a target body having a spherical or hemispherical outer shell, and a mounting stage with a hemispherical groove into which the outer shell of the target body removably fits.

19. Target for setting reference points on construction according to claim 18, wherein the position adjusting mechanism includes guide stage on which a guide means is formed in a direction or two guide means are formed in two directions that intersect at right angle, the direction or directions parallel to a surface of the construction.

20. Target for setting reference points on construction according to claim 18, wherein the position adjusting mechanism includes guide stage on which a guide means is formed in a direction vertical to a surface of the construction.

* * * * *